(12) United States Patent
Gesti Garcia et al.

(10) Patent No.: US 10,988,587 B2
(45) Date of Patent: Apr. 27, 2021

(54) POLYMER COMPOSITION FOR HIGHLY DISINTEGRATABLE FILM

(71) Applicant: NOVAMONT S.P.A., Novara (IT)

(72) Inventors: Sebastia Gesti Garcia, Turin (IT); Giovanni Tettoni, Invorio (IT)

(73) Assignee: NOVAMONT S.P.A., Novara (IT)

( * ) Notice: Subject to any disclaimer, the term of this patent is extended or adjusted under 35 U.S.C. 154(b) by 77 days.

(21) Appl. No.: 16/487,671

(22) PCT Filed: Feb. 27, 2018

(86) PCT No.: PCT/EP2018/054843
§ 371 (c)(1),
(2) Date: Aug. 21, 2019

(87) PCT Pub. No.: WO2018/158269
PCT Pub. Date: Sep. 7, 2018

(65) Prior Publication Data
US 2020/0002487 A1  Jan. 2, 2020

(30) Foreign Application Priority Data

Feb. 28, 2017 (IT) .................... 102017000022439

(51) Int. Cl.
 *C08J 5/18* (2006.01)
 *C08G 63/16* (2006.01)
 *C08G 63/183* (2006.01)
 *C08L 67/02* (2006.01)
 *C09K 17/52* (2006.01)

(52) U.S. Cl.
 CPC ............. *C08J 5/18* (2013.01); *C08G 63/16* (2013.01); *C08G 63/183* (2013.01); *C08L 67/02* (2013.01); *C09K 17/52* (2013.01); *C08J 2367/02* (2013.01); *C08J 2467/02* (2013.01); *C08J 2467/04* (2013.01); *C08L 2203/16* (2013.01); *C08L 2205/02* (2013.01); *C08L 2205/03* (2013.01)

(58) Field of Classification Search
 CPC ...... C08J 5/18; C08J 2367/02; C08J 2467/02; C08J 2467/04; C08G 63/16; C08G 63/183; C08L 67/02; C08L 2203/16; C08L 2205/02; C08L 2205/03; C09K 17/52
 USPC .......................................... 524/539
 See application file for complete search history.

(56) References Cited

U.S. PATENT DOCUMENTS

| | | | | |
|---|---|---|---|---|
| 9,206,311 | B2 * | 12/2015 | Steinke | C08L 97/02 |
| 9,914,832 | B2 * | 3/2018 | Lehenmeier | B65D 43/00 |
| 10,526,461 | B2 * | 1/2020 | Yang | C08L 67/04 |
| 2011/0237750 | A1 * | 9/2011 | Ren | C08J 5/18 |
| | | | | 525/173 |
| 2012/0288650 | A1 * | 11/2012 | Freese | C08L 67/02 |
| | | | | 428/35.5 |

FOREIGN PATENT DOCUMENTS

| | | | | |
|---|---|---|---|---|
| CA | 2948416 A1 * | 11/2015 | ............ | B65D 43/00 |
| EP | 1 227 129 A1 | 7/2002 | | |
| WO | WO 2015/169659 A1 | 11/2015 | | |

* cited by examiner

*Primary Examiner* — Michael Bernshteyn
(74) *Attorney, Agent, or Firm* — Polsinelli PC

(57) ABSTRACT

This invention relates to a polymer composition which is particularly suitable for use in the manufacture of films having a great ability to disintegrate, preferably at low temperatures, which can be used in the mulch film sector.

20 Claims, No Drawings

POLYMER COMPOSITION FOR HIGHLY DISINTEGRATABLE FILM

CROSS REFERENCE TO RELATED APPLICATIONS

This application is a National Phase filing under 35 U.S.C. § 371 of PCT/EP2018/054843 filed on 27 Feb. 2018; which application in turn claims priority to Application No. 102017000022439 filed in Italy on 28 Feb. 2017. The entire contents of each application are hereby incorporated by reference.

This invention relates to a polymer composition that is particularly suitable for use in the manufacture of films having a great ability to disintegrate, advantageously at low temperatures, which can be used for example in the sector of mulching sheets.

Mulching is an operation performed in agriculture which comprises covering the ground with a protective layer capable of for example preventing the growth of weeds, retaining moisture, limiting erosion and raising the temperature of the ground.

In this sector, the use has been widespread for some time of sheets manufactured using films of plastics materials (known as mulch films) which have numerous advantages, such as for example a great reduction in water consumption, earlier harvesting, reduced fertiliser wash-out and less compaction of the soil which is therefore more aerated.

The development of films with a high ability to disintegrate, preferably at low temperatures, is therefore of great interest for applications in the mulching sector, but this may adversely affect the mechanical properties of these films. In comparison with the mulching films present on the market, they have good mechanical properties but little ability to disintegrate.

The problem underlying the present invention is therefore that of producing films characterised by an ability to disintegrate, especially at low temperatures, and optimum mechanical properties, so that the films so obtained can find application in the mulch films sector.

It has now surprisingly been found that it is possible to solve this problem through a composition made using aliphatic and aliphatic-aromatic polyesters which increase the low temperature disintegration rate of the films obtained from that composition, while maintaining, if not improving, their mechanical properties.

Also, use of such a composition in the cast extrusion process may be easily implemented without requiring modifications to existing equipment.

In particular, the present invention relates to a film comprising a composition comprising:
i) 40-80% by weight, with respect to the total weight of the composition, of at least one aliphatic polyester (i) comprising:
  a) a dicarboxylic component comprising with respect to the total of the dicarboxylic component:
    a1) 70-100% by moles of units deriving from succinic acid, and
    a2) 0-30% by moles, preferably 3-20% by moles, more preferably 5-15% by moles of units deriving from at least one saturated dicarboxylic acid different from succinic acid, and
  b) a diol component comprising with respect to the total diol component:
    b1) 95-100% by moles of units deriving from 1,4-butanediol, and
    b2) 0-5% by moles of units deriving from at least one saturated aliphatic diol different from 1,4-butanediol;
ii) 5-40% by weight, with respect to the total weight of the composition, of at least one aliphatic-aromatic polyester (ii) comprising:
  a) a dicarboxylic component comprising with respect to the total dicarboxylic component:
    a1) 30-70% by moles of units deriving from at least one aromatic dicarboxylic acid, and
    a2) 70-30% by moles of units deriving from at least one saturated aliphatic dicarboxylic acid, and
  b) a diol component comprising with respect to the total diol component:
    b1) 95-100% by moles of units deriving from at least one saturated aliphatic diol, and
    b2) 0-5% by moles of units deriving from at least one unsaturated aliphatic diol; and
iii) 1-25% by weight, with respect to the total weight of the composition, of at least one polyhydroxyalkanoate (iii),
said film having an impact strength index of at least 2 mJ/(g/m$^2$), measured according to ASTM D3420-08a.

The film of the invention preferably has an impact strength index of at least 3 mJ/(g/m$^2$), more preferably of at least 5 mJ/(g/m$^2$), measured according to ASTM D3420-08a.

The film of the invention preferably has an impact strength index of at most 60 mJ/(g/m$^2$), more preferably of at most 55 mJ/(g/m$^2$), even more preferably of at most 50 mJ/(g/m$^2$), measured according to ASTM D3420-08a.

The film of the invention preferably has an impact strength index of from 2 mJ/(g/m$^2$) to 60 mJ/(g/m$^2$), more preferably of from 2 mJ/(g/m$^2$) to 55 mJ/(g/m$^2$), even more preferably of from 2 mJ/(g/m$^2$) to 50 mJ/(g/m$^2$), measured according to ASTM D3420-08a.

The amount of the at least one aliphatic polyester (i) in the composition of the film of the invention is generally of at least 55% by weight, preferably of at least 60% by weight, with respect to the total weight of the composition.

The amount of the at least one aliphatic polyester (i) in the composition of the film of the invention is generally of at most 75% by weight, preferably of at most 70% by weight, with respect to the total weight of the composition.

The amount of the at least one aliphatic-aromatic polyester (ii) in the composition of the film of the invention is generally of at least 7% by weight, preferably of at least 16% by weight, with respect to the total weight of the composition.

The amount of the at least one aliphatic-aromatic polyester (ii) in the composition of the film of the invention is generally of at most 30% by weight, preferably of at most 25% by weight, with respect to the total weight of the composition.

The amount of the at least one polyhydroxyalkanoate (iii) in the composition of the film of the invention is generally of at least 5% by weight, preferably at least 10% by weight, with respect to the total weight of the composition.

The amount of the at least one polyhydroxyalkanoate (iii) in the composition of the film of the invention is generally of at most 20% by weight, with respect to the total weight of the composition.

In a preferred embodiment of the invention, the film of the invention comprises a composition comprising:
i) 60-80% by weight, preferably 60-70% by weight, with respect to the total weight of the composition, of at least one aliphatic polyester (i), ii) 5-30% by weight, with respect to the total weight of the composition, of at least one aliphatic-aromatic polyester (ii), and iii) 1-25% by weight, with respect to the total weight of the composition, of at least one polyhydroxyalkanoate (iii), said film having an impact strength index of at least 2 mJ/(g/m$^2$), measured according to ASTM D3420-08a.

In a particularly preferred embodiment of the invention, the film of the invention comprises a composition comprising:

i) 60-80% by weight, preferably 60-70% by weight, with respect to the total weight of the composition, of at least one aliphatic polyester (i), ii) 16-30% by weight, with respect to the total weight of the composition, of at least one aliphatic-aromatic polyester (ii), and iii) 1-20% by weight, with respect to the total weight of the composition, of at least one polyhydroxyalkanoate (iii), said film having an impact strength index of at least 2 mJ/(g/m$^2$), measured according to ASTM D3420-08a.

As far as the aliphatic polyesters (i) in the composition of the film of the invention are concerned, these comprise a dicarboxylic component comprising, with respect to the total dicarboxylic component, 70-100% by moles, preferably 80-100% by moles, more preferably 90-100% by moles of units deriving from succinic acid (component a1) and 0-30% by moles, preferably 3-20% by moles, more preferably 5-15% by moles of units deriving from at least one saturated dicarboxylic acid different from succinic acid (component a2).

The saturated aliphatic dicarboxylic acids which are different from succinic acid (component a2) in the aliphatic polyester (i) of the composition of the film of the invention are preferably selected from saturated $C_2$-$C_{24}$, preferably $C_4$-$C_{13}$, more preferably $C_4$-$C_{11}$, saturated dicarboxylic acids, their $C_1$-$C_{24}$, preferably $C_1$-$C_4$, alkyl esters, their salts and mixtures thereof. Preferably, the saturated aliphatic dicarboxylic acids which are different from succinic acid are selected from the group consisting of 2-ethylsuccinic acid, glutaric acid, 2-methylglutaric acid, adipic acid, pimelic acid, suberic acid, azelaic acid, sebacic acid, undecandioic acid, dodecandioic acid, brassylic acid and their $C_1$-$C_{24}$ alkyl esters. In a preferred embodiment of the invention, the saturated aliphatic dicarboxylic acid different from succinic acid is selected from the group consisting of adipic acid, azelaic acid, sebacic acid and mixtures thereof. In an even more preferred embodiment of the invention, the saturated aliphatic dicarboxylic acid different from succinic acid is azelaic acid.

In the meaning of this invention, the dicarboxylic component of the aliphatic polyesters (i) of the composition of the film of the invention substantially comprises aliphatic acids, but may also comprise base monomers and other components in quantities which are not such as to have an adverse effect on the function and/or basic structure of the polyester.

For example, the dicarboxylic component of the aliphatic polyesters (i) of the composition of the film of the invention may comprise up to 10% by moles of aromatic dicarboxylic acids, preferably selected from aromatic dicarboxylic acids of the type of phthalic acid, preferably terephthalic acid or isophthalic acid, more preferably terephthalic acid, and heterocyclic dicarboxylic aromatic compounds, preferably 2,5-furandicarboxylic acid, 2,4-furandicarboxylic acid, 2,3-furandicarboxylic acid, 3,4-furandicarboxylic acid, their esters, salts and mixtures.

The dicarboxylic component of the aliphatic polyesters (i) of the composition of the film of the invention may comprise up to 5% of unsaturated aliphatic dicarboxylic acids, preferably selected from the group consisting of itaconic acid, fumaric acid, 4-methylene pimelic acid, 3,4-bis (methylene) nonandioic acid, 5-methylene-nonandioic acid, their $C_1$-$C_{24}$, preferably $C_1$-$C_4$, alkyl esters, their salts and mixtures thereof. In a preferred embodiment of the invention, the unsaturated aliphatic dicarboxylic acids comprise mixtures comprising at least 50% by moles, preferably more than 60% by moles, more preferably more than 65% by moles of itaconic acid and/or its $C_1$-$C_{24}$, preferably $C_1$-$C_4$, esters. More preferably, the unsaturated aliphatic dicarboxylic acids comprise itaconic acid.

The diol component of the aliphatic polyesters (i) of the composition of the film of the invention comprises, with respect to the total diol component, 95-100% by moles, preferably 97-100% by moles of units deriving from 1,4-butanediol (component b1) and 0-5% by moles, preferably 0-3% by moles, with respect to the total diol component, of units deriving from at least one saturated aliphatic diol different from 1,4-butanediol (component b2). The saturated aliphatic diols which are not 1,4-butanediol (component b2) of the aliphatic polyesters (i) of the composition of the film of the invention are preferably selected from 1,2-ethanediol, 1,2-propanediol, 1,3-propanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentyl glycol, 2-methyl-1,3-propanediol, dianhydrosorbitol, dianhydromannitol, dianhydroiditol, cyclohexanediol, cyclohexanmethanediol, dialkylene glycols and polyalkylene glycols having a molecular weight of 1000-4000 such as for example polyethylene glycol, polypropylene glycol and mixtures thereof.

The diol component of the aliphatic polyesters (i) of the composition of the film of the invention may comprise up to 5% of unsaturated aliphatic diols, preferably selected from the group consisting of cis 2-butene-1,4-diol, trans 2-butene-1,4-diol, 2-butyne-1,4-diol, cis 2-pentene-1,5-diol, trans 2-pentene-1,5-diol, 2-pentyne-1,5-diol, cis 2-hexene-1,6-diol, trans 2-hexene-1,6-diol, 2-hexyne-1,6-diol, cis 3-hexene-1,6-diol, trans 3-hexene-1,6-diol, 3-hexyne-1,6-diol.

In a particularly preferred embodiment, the aliphatic polyesters (i) of the composition of the film of the invention are selected from the group consisting of poly(1,4-butylene succinate), poly(1,4-butylene succinate-co-adipate) and poly(1,4-butylene succinate-co-1,4-butylene azelate).

The aliphatic polyesters (i) of the composition of the film of the invention may also advantageously comprise units deriving from at least one hydroxy acid in a quantity of between 0 and 30% by moles, with respect to the total moles of dicarboxylic component. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxy acids may be inserted into a chain as such or may also be first caused to react with diacids or diols.

Long molecules with two functional groups which also have functional groups which are not in the terminal position may also be added in a quantity not exceeding 10% by moles with respect to the total moles of dicarboxylic component. Examples are dimer acids, ricinoleic acid or acids having epoxide functional groups or even polyoxyethylenes having a molecular weight of between 200 and 10000.

Diamines, amino acids or amino alcohols may also be present in percentages up to 30% by moles with respect to the total moles of dicarboxylic component.

In the process of preparing the aliphatic polyesters (i) of the composition of the film of the invention, one or more molecules having multiple functional groups may also be advantageously, in quantities of between 0.1% and 3% by moles, with respect to the total moles of dicarboxylic component, in order to obtain branched products. Examples of these molecules are glycerol, pentaerythritol, trimethylol propane, citric acid, dipentaerythritol, monoanhydrosorbitol, monohydromannitol, acid triglycerides, polyglycerols, etc.

The molecular weight $M_n$ of the aliphatic polyesters (i) of the composition of the film of the invention is preferably ≥20000, more preferably ≥40000. As far as the polydispersity index of the molecular weights $M_w/M_n$ is concerned, this instead is preferably between 1.5 and 10, more preferably between 1.6 and 5 and even more preferably between 1.8 and 2.7.

Molecular weights $M_n$ and $M_w$ can be measured using Gel Permeation Chromatography (GPC). The determination may be performed with the chromatography system held at 40° C., using a set of two columns in series (particle diameter 5 μm and 3 μm with mixed porosity) a refractive index detector, chloroform as eluent (flow 1 ml/min) and using polystyrene as the reference standard.

The Melt Flow Rate (MFR) of the aliphatic polyesters (i) preferably lies between 500 and 1 g/10 min, more preferably between 100 and 3 g/10 min, even more preferably between 15 and 4 g/10 min (measurement made at 190° C. and 2.16 kg according to standard ISO 1133-1 "Plastics—determination of the melt mass-flow rate (MFR) and melt volume flow rate (MVR) of thermoplastics—Part 1: Standard method").

The terminal acids group content of the aliphatic polyesters (i) of the composition according to the invention is preferably between 30 and 160 meq/kg.

The terminal acid groups content may be measured in the following way: 1.5-3 g of polyester are placed in a 100 ml flask together with 60 ml of chloroform. After the polyester has completely dissolved 25 ml of 2-propanol are added, and, immediately before the analysis, 1 ml of deionised water.

The solution so obtained is titrated against a previously standardised solution of NaOH in ethanol. An appropriate indicator such as for example a glass electrode for acid-base titrations in non-aqueous solvents is used to determine the end point of the titration. The terminal acid groups content is calculated on the basis of the consumption of NaOH solution in ethanol in accordance with the following equation:

$$\text{Terminal acid groups content (meq/kg polymer)} = \frac{[(V_{eq} - V_b) \cdot T] \cdot 100}{P}$$

where: $V_{eq}$=ml of NaOH solution in ethanol at the end point of the sample titration;
$V_b$=ml of NaOH solution in ethanol required to achieve pH=9.5 during the blank titration;
T=concentration of the NaOH solution in ethanol expressed in moles/litre;
P=weight of the sample in grams.

Preferably, the aliphatic polyesters (i) of the composition of the film of the invention have an inherent viscosity (measured using a Ubbelohde viscosity meter for solutions in $CHCl_3$ having a concentration of 0.2 g/dl at 25° C.) of more than 0.3 dl/g, preferably between 0.3 dl/g and 2 dl/g, more preferably between 0.4 dl/g and 1.3 dl/g.

As far as the aliphatic-aromatic polyesters (ii) of the composition of the film of the invention are concerned, these comprise a dicarboxylic component which comprises, with respect to the total dicarboxylic component, 30-70% by moles, preferably 40-60% by moles of units deriving from at least one aromatic dicarboxylic acid (component a1) and 70-30% by moles, preferably 60-40% by moles of units deriving from at least one saturated aliphatic dicarboxylic acid (component a2).

The aromatic dicarboxylic acids (component a1) of the aliphatic-aromatic polyesters (ii) of the composition of the film of the invention are preferably selected from aromatic dicarboxylic acids of the type of phthalic acid, preferably terephthalic acid or isophthalic acid, or preferably terephthalic acid, and heterocyclic dicarboxylic aromatic compounds, preferably 2,5-furandicarboxylic acid, 2,4-furandicarboxylic acid, 2,3-furandicarboxylic acid, 3,4-furandicarboxylic acid, their esters, salts and mixtures thereof.

The saturated aliphatic dicarboxylic acids (component a2) of the aliphatic-aromatic polyesters (ii) are instead preferably selected from $C_2$-$C_{24}$, preferably $C_4$-$C_{13}$, more preferably $C_4$-$C_{11}$ saturated dicarboxylic acids, their $C_1$-$C_{24}$, preferably $C_1$-$C_4$, alkyl esters, their salts and mixtures thereof. Preferably, the saturated aliphatic dicarboxylic acids are selected from the group consisting of succinic acid, 2-ethylsuccinic acid, glutaric acid, 2-methylglutaric acid, adipic acid, pimelic acid, suberic acid, azelaic acid, sebacic acid, undecandioic acid, dodecandioic acid, brassylic acid and their $C_1$-$C_{24}$ alkyl esters. Preferably, the saturated aliphatic dicarboxylic acids are selected from the group consisting of succinic acid, adipic acid, azelaic acid, sebacic acid, brassylic acid and mixtures thereof. More preferably, the saturated aliphatic dicarboxylic acids are selected from adipic acid and azelaic acid.

The dicarboxylic component of the aliphatic-aromatic polyesters (ii) of the composition of the film of the invention may comprise up to 5% of unsaturated aliphatic dicarboxylic acids, preferably selected from itaconic acid, fumaric acid, 4-methylene-pimelic acid, 3,4-bis (methylene) nonandioic acid, 5-methylene-nonandioic acid, their $C_1$-$C_{24}$, preferably $C_1$-$C_4$, alkyl esters, their salts and mixtures thereof. In a preferred embodiment of the invention, the unsaturated aliphatic dicarboxylic acids comprise mixtures comprising at least 50% by moles, preferably more than 60% by moles, more preferably more than 65% by moles of itaconic acid and/or its $C_1$-$C_{24}$, preferably $C_1$-$C_4$, esters. More preferably, the unsaturated aliphatic dicarboxylic acids consist of itaconic acid.

The diol component of the aliphatic-aromatic polyesters (ii) of the composition of the film of the invention comprises, with respect to the total diol component, 95-100% by moles, preferably 97-100% by moles, of units deriving from at least one saturated aliphatic diol (component b1) and 0-5% by moles, preferably 0-3% by moles, with respect to the total diol component, of units deriving from at least one unsaturated aliphatic diol (component b2). The saturated aliphatic diols (component b1) of the aliphatic-aromatic polyesters (ii) of the composition of the film of the invention are preferably selected from the group consisting of 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4- cyclohexandimethanol, neopentylglycol, 2-methyl-1,3-propanediol, dianhydrosorbitol, dianhydromannitol, dianhydroiditol, cyclohexanediol, cyclohexanmethanediol, dialkylene glycols and polyalkylene glycols having a molecular weight of 100-4000, such as for example polyethylene glycol, polypropylene glycol and mixtures thereof. Preferably, the diol component comprises at least 50% by moles of one or more diols selected from 1,2-ethanediol, 1,3-propanediol or 1,4-butanediol.

In a preferred embodiment of the invention, the saturated aliphatic diol is 1,4-butanediol. The unsaturated aliphatic diols (component b2) of the aliphatic-aromatic polyesters (ii) of the composition of the film of the invention are preferably selected from the group consisting of cis 2-butene-1,4-diol, trans 2-butene-1,4-diol, 2-butyne-1,4-diol, cis 2-pentene-1,5-diol, trans 2-pentene-1,5-diol, 2-pentyne-1,5-diol, cis 2-hexene-1,6-diol, trans 2-hexene-1,6-diol, 2-hexyne-1,6-diol, cis 3-hexene-1,6-diol, trans 3-hexene-1,6-diol and 3-hexyne-1,6-diol. In a preferred embodiment, the aliphatic-aromatic polyesters (ii) are preferably selected from the group consisting of poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate).

The aliphatic-aromatic polyesters (ii) may also advantageously comprise units deriving from at least one hydroxyacid in a quantity of between 0 and 49%, preferably between 0 and 30%, by moles, with respect to the total moles of dicarboxylic component. Examples of convenient hydroxyacids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxy acids may be inserted into a chain as such or may also be first caused to react with diacids or diols.

Long molecules having two functional groups which also do not have functional groups in the terminal position may also be added in quantities not exceeding 10% by moles, with respect to the total moles of dicarboxylic component. Examples are dimer acids, ricinoleic acid and acids having epoxide functional groups and also polyoxyethylenes having a molecular weight of between 200 and 10000.

Diamines, amino acids and amino alcohols may also be present in percentages up to 30% by moles, with respect to the total moles of dicarboxylic component.

In the process for preparing the aliphatic-aromatic polyesters (ii) of the composition of the film of the invention, one or more molecules containing multiple functional groups may also be advantageously added, in quantities of between 0.1% and 3% by moles, with respect to the total moles of dicarboxylic component (and any hydroxyacids), in order to obtain branched products. Examples of these molecules are glycerol, pentaerythritol, trimethylolpropane, citric acid, dipentaerythritol, monoanhydrosorbitol, monohydromannitol, acid triglycerides, polyglycerols, etc.

The molecular weight $M_w$ of the aliphatic-aromatic polyesters (ii) of the composition according to the invention is preferably ≥20000, more preferably ≥40000. As regards the polydispersity index of the molecular weights $M_w/M_n$, this is instead preferably between 1.5 and 10, more preferably between 1.6 and 5 and even more preferably between 1.8 and 2.7. Molecular weights $M_n$ and $M_w$ may be measured using the method described for the aliphatic polyesters (i).

The Melt Flow Rate (MFR) of the aliphatic-aromatic polyesters (ii) is preferably between 500 and 1 g/10 min, more preferably between 100 and 3 g/10 min, even more preferably between 15 and 3 g/10 min (measurement made at 190° C./2.16 kg according to standard ISO 1133-1 "Plastics—determination of the melt mass-flow rate (MFR) and melt volume flow rate (MVR) of thermoplastics—Part 1: Standard method").

The terminal acid groups content of the aliphatic-aromatic polyesters (ii) of the composition of the film of the invention is preferably below 100 meq/kg, preferably below 60 meq/kg and even more preferably below 40 meq/kg.

The terminal acid groups content may be measured according to the method described for the aliphatic polyester (i).

Preferably, the aliphatic-aromatic polyesters (ii) of the composition of the film of the invention have an inherent viscosity (measured using an Ubbelohde viscosity meter for solutions in $CHCl_3$ of concentration 0.2 g/dl at 25° C.) of more than 0.3 dl/g, preferably between 0.3 and 2 dl/g, more preferably between 0.4 and 1.1 dl/g.

Each of the aliphatic polyester (i) and the aliphatic-aromatic polyester (ii) of the composition of the film of the invention may be synthesised according to any of the processes known in the state of the art. In particular, they may advantageously be obtained by means of a polycondensation reaction.

Advantageously, the process of synthesis may be carried out in the presence of a suitable catalyst. As suitable catalysts mention may for example be made of organometallic compounds of tin, for example stannoic acid derivatives, titanium compounds, for example orthobutyl titanate, and compounds of aluminium, for example Al-triisopropyl, antimony and zinc and zirconium and mixtures thereof.

Examples of processes of synthesis which may advantageously be used for preparation of the polyesters are described in International Patent Application WO 2016/050963.

In addition to at least one aliphatic polyester (i) and at least one aliphatic-aromatic polyester (ii), the composition of the film of the invention comprises 1-25% by weight, with respect to the total weight of the composition, of at least one polyhydroxyalkanoate (iii). The polyhydroxyalkanoate (iii) is preferably selected from the group consisting of polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly 3-hydroxybutyrate-4-hydroxybutyrate. Preferably, the polyhydroxyalkanoate comprises at least 80% by weight of one or more polyesters of lactic acid.

In a preferred embodiment, the lactic acid polyesters are selected from the group consisting of poly L-lactic acid, poly D-lactic acid, stereo complex of poly D-L lactic acid, copolymers comprising more than 50% by moles of the said lactic acid polyesters or mixtures thereof. Particularly preferred are polyesters of lactic acid containing at least 95% by weight of repeating units deriving from L-lactic acid or D-lactic acid or their combinations, having a molecular weight $M_w$ of more than 50000 and a shear viscosity of 50-700 Pa·s, preferably 80-500 Pa·s (measured according to standard ASTM D3835 at T=190° C., shear rate=1000 s$^{-1}$, D=1 mm, L/D=10).

In a particularly preferred embodiment of the invention, the lactic acid polyester comprises at least 95% by weight of units deriving from L-lactic acid, ≤5% of repetitive units deriving from D-lactic acid, has a melting point in the range 135-175° C., a glass transition temperature ($T_g$) in the range 55-65° C. and an MFR (measured according to standard ASTM-D1238 at 190° C. and 2.16 kg) in the range 1-50 g/10 min. Commercial examples of lactic acid polyesters having these properties are for example the products of the Ingeo™ make, Biopolymer 4043D, 3251D and 6202D.

The composition of the film of the invention preferably comprises 0-5% by weight, more preferably 0.05-4% by weight, even more preferably 0.1-3% by weight, with respect to the total weight of the composition, of at least one cross-linking agent and/or chain extender (component iv). The component iv generally improves stability to hydrolysis of the composition as defined above. The component iv is typically selected from compounds having two and/or multiple functional groups including isocyanate, peroxide, carbodiimide, isocyanurate, oxazoline, epoxide, anhydride and divinylether and mixtures thereof.

Preferably, the cross-linking agent and/or chain extender comprises at least one compound having two and/or multiple functional groups containing epoxide or carbodiimide groups. Preferably, the cross-linking agent and/or chain extender comprises at least one compound having two and/or multiple functional groups including isocyanate groups. More preferably, the cross-linking agent and/or chain extender comprises at least 25% by weight of one or more compounds having two and/or multiple functional groups including isocyanate groups. Mixtures of compounds having two and/or multiple functional groups including isocyanate groups of compounds with two and/or multiple functional groups including epoxide groups, even more preferably comprising at least 75% by weight of compounds having two and/or multiple functional groups including isocyanate groups are particularly preferred.

The compounds containing two and multiple functional groups including isocyanate groups are preferably selected from p-phenylene diisocyanate, 2,4-toluene diisocyanate, 2,6-toluene diisocyanate, 4,4-diphenylmethane diisocyanate, 1,3-phenylene-4-chloro diisocyanate, 1,5-naphthalene diisocyanate, 4,4-diphenylene diisocyanate, 3,3'-dimethyl-4,4-diphenylmethane diisocyanate, 3-methyl-4,4'-diphenylmethane diisocyanate, diphenyl ester diisocyanate, 2,4-cyclohexane diisocyanate, 2,3-cyclohexane diisocyanate, 1-methyl-2,4-cyclohexyl diisocyanate, 1-methyl-2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenyl methane triisocyanate, 3,3'-ditolylene-4,4-diisocyanate, 4,4'-methylene bis(2-methyl-phenyl isocyanate), hexamethylene diisocyanate, 1,3-cyclohexylene diisocyanate, 1,2-cyclohexylene diisocyanate and mixtures thereof. In a preferred embodiment, the compound containing isocyanate groups is 4,4-diphenyl methane diisocyanate.

As far as the compounds containing two and multiple functional groups including peroxide groups are concerned, these are preferably selected from benzoyl peroxide, lauroyl peroxide, isononanoyl peroxide, di-(t-butylperoxyisopropyl) benzene, t-butyl peroxide, dicumyl peroxide, alpha,alpha'-di(t-butylperoxy)diisopropylbenzene, 2,5-dimethyl-2,5-di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxy dicarbonate, dicetyl peroxydicarbonate, dimyristyl peroxydicarbonate, 3,6,9-triethyl-3,6,9-trimethyl-1,4,7-triperoxonan, di(2-ethylhexyl) peroxydicarbonate and mixtures thereof.

The compounds having two and multiple functional groups including carbodiimide groups which are preferably used in the composition of the film of the invention are selected from poly(cyclooctylene carbodiimide), poly(1,4-dimethylenecyclohexylene carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetraisopropyl-diphenylene carbodiimide) (Stabaxol® D), poly(2,4,6-triisopropyl-1,3-phenylene carbodiimide) (Stabaxol® P-100), poly(2,6-diisopropyl-1,3-phenylene carbodiimide) (Stabaxol® P), poly(tolyl carbodiimide), poly(4,4'-diphenylmethane carbodiimide), poly(3,3'-dimethy-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof.

Examples of compounds having two and multiple functional groups including epoxide groups which may advantageously be used in the composition of the film of the invention are all polyepoxides from epoxidated oils and/or styrene-glycidylether-methylmethacrylate, glycidylether methylmethacrylate, lying in a molecular weight range between 1000 and 10000 and having an epoxide number per molecule in the range from 1 to 30 and preferably between 5 and 25, and epoxides selected from the group consisting of diethyleneglycol diglycidyl ether, polyethylene glycol diglydicyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohexanmethanol diglycidyl ether, glycidyl 2-methyl phenylether, glycerol propoxylatotriglycidyl ether, 1,4-butanediol diglycidyl ether, sorbitol polyglycidyl ether, glycerol diglycidyl ether, tetraglycidyl ether of meta-xylene diamine and diglycidyl ether of bisphenol A and mixtures thereof.

In a particularly preferred embodiment of the invention, the cross-linking agent and/or chain extender of the composition of the film of the invention comprises compounds including isocyanate groups, preferably 4,4-diphenylmethane diisocyanate, and/or containing carbodiimide groups, and/or containing epoxide groups, preferably of the styrene-glycidylether-methylmethacrylate type.

In a particularly preferred embodiment of the invention, the cross-linking agent and/or chain extender comprises compounds containing epoxide groups of the styrene-glycidylether-methylmethacrylate type.

Together with the compounds having two and multiple functional groups including isocyanate, peroxide, carbodiimide, isocyanurate, oxazoline, epoxide, anhydride and divinylether groups of the composition of the film of the invention, catalysts may also be used to render the reactivity of the reactive groups greater. In the case of polyepoxides, salts of fatty acids, even more preferably calcium and zinc stearates, are used.

The composition of the film of the invention may further comprise 0-30% by weight, with respect to the total weight of the composition, of at least one filler, preferably selected from kaolin, barytes, clay, talc, calcium and magnesium, iron and lead carbonates, aluminium hydroxide, diatomaceous earth, aluminium sulphate, barium sulphate, silica, mica, titanium dioxide, wollastonite, starch, chitin, chitosan, alginates, proteins such as gluten, zein, casein, collagen, gelatin, natural rubbers, rosinic acid and derivatives thereof.

By the term starch it is meant here all types of starch such as flour, native starch, hydrolysed starch, destructured starch, gelatinised starch, plasticised starch, thermoplastic starch, biofiller comprising complexed starch and mixtures thereof. Particularly suitable according to the invention are starches such as those from potato, maize, tapioca and peas.

Starches capable of being readily destructured which have high initial molecular weights, such as for example potato or maize starch, have proved to be particularly advantageous.

The starch may be present as such or in a chemically modified form, such as for example in the form of starch esters with a degree of substitution of between 0.2 and 2.5, starch hydroxypropylate, or starch modified with fatty chains.

By destructured starch reference is made here to the teachings included in patents EP-0 118 240 and EP-0 327 505, by such being meant starch processed in such a way as not to substantially show the so-called "Maltese crosses" under the optical microscope in polarised light and the so-called "ghosts" under a phase contrast optical microscope.

Advantageously, destructuring of the starch is brought about through an extrusion process at temperatures of between 110° C. and 250° C., preferably between 130° C. and 200° C., preferably at pressures of between 0.1 MPa and 7 MPa, preferably between 0.3 MPa and 6 MPa, preferably providing a specific energy of more than 0.1 kWh/kg during the said extrusion.

Destructuring of the starch preferably takes place in the presence of 1-40% by weight, with respect to the weight of the starch, of one or more plasticisers selected from water and polyols having from 2 to 22 carbon atoms. As far as the water is concerned, water may be naturally present in the starch. Among the polyols, polyols having from 1 to 20 hydroxyl groups containing 2 to 6 carbon atoms, their ethers, thioethers and organic and inorganic esters are preferred. Examples of polyols are glycerine, diglycerol, polyglycerol, pentaerythritol, polyglycerol ethoxylate, ethylene glycol, polyethylene glycol, 1,2-propanediol, 1,3-propanediol, 1,4-butanediol, neopentyl glycol, sorbitol monoacetate, sorbitol diacetate, sorbitol monoethoxylate, sorbitol diethoxylate, and mixtures thereof. In a preferred embodiment, the starch is destructured in the presence of glycerol or a mixture of plasticisers comprising glycerol, more preferably comprising between 2% and 90% by weight of glycerol. Preferably, the destructured cross-linked starch comprises between 1% and 40% by weight of plasticisers, with respect to the weight of the starch.

When present, the starch in the composition is preferably in the form of particles having a circular or elliptical cross-section or in any event a cross-section which can be likened to an ellipse having an arithmetical mean diameter of less than 1 μm and more preferably less than 0.5 μm mean diameter, measured taking the major axis of the particle into consideration.

In a preferred embodiment of the invention, the filler comprises talc and/or starch and/or calcium and magnesium carbonate.

The composition of the film of the invention may further comprise 0-30% by weight, with respect to the total weight of the composition, of plant fibres, preferably selected from cellulose fibres, wood flour, hemp fibre, lignocelluloses wastes originating from raw materials of plant origin such as for example thistle and sunflower plants, and grass cuttings.

The composition of the film of the invention preferably also contains at least one other component selected from the group consisting of plasticisers, UV stabilisers, lubricants, nucleating agents, surfactants, antistatic agents, pigments, flame retardants, compatibilising agents, lignin, organic acids, antioxidants, mould inhibiters, waxes, process coadjuvants and polymer components preferably selected from the group consisting of vinyl polymers, diacid diol polyesters which are different from the aliphatic polyesters (i) and the aliphatic-aromatic polyester (ii), polyamides, polyurethanes, polyethers, polyureas, polycarbonates.

As far as the plasticisers are selected, in addition to the plasticisers which are preferably used for preparation of the destructured starch described above, the composition of the film of the invention preferably contains one or more plasticisers selected from the group consisting of phthalates, such as for example diisononyl phthalate, trimellitates, such as for example the esters of trimellitic acid with $C_4$-$C_{20}$ monoalcohols preferably selected from the group consisting of n-octanol and n-decanol, and aliphatic esters having the following structure:

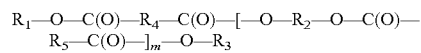

in which $R_1$ is selected from one or more of the groups comprising H, saturated and unsaturated linear and branched alkyl residues of the $C_1$-$C_{24}$ type, polyol residues esterified with $C_1$-$C_{24}$ monocarboxylic acids;

$R_2$ comprises —$CH_2$—$C(CH_3)_2$—$CH_2$— and $C_2$-$C_8$ alkylene groups, and comprises at least 50% by moles of the said —$CH_2$—$C(CH_3)_2$—$CH_2$— groups;

$R_3$ is selected from one or more of the groups comprising H, saturated and unsaturated linear and branched alkyl residues of the $C_1$-$C_{24}$ type, polyol residues esterified with $C_1$-$C_{24}$ monocarboxylic acids;

$R_4$ and $R_5$ are the same or different, and comprise one or more $C_2$-$C_{22}$, preferably $C_2$-$C_{11}$, more preferably $C_4$-$C_9$, alkylenes, and comprise at least 50% by moles of $C_7$ alkylenes; and m is an integer between 1 and 20, preferably between 2 and 10, more preferably between 3 and 7.

Preferably, in the said esters at least one of the $R_1$ and/or $R_3$ groups comprises, preferably in a quantity of at least 10% by moles, more preferably of at least 20%, even more preferably of at least 25% by moles, with respect to the total quantity of $R_1$ and/or $R_3$ groups of polyol residues esterified with at least one $C_1$-$C_{24}$ monocarboxylic acid selected from the group consisting of stearic acid, palmitic acid, 9-ketostearic acid, 10-ketostearic acid and mixtures thereof. Examples of aliphatic esters of this type are described in Italian patent application MI2014A000030 and in PCT applications PCT/EP2015/050336 and PCT/EP2015/050338.

When present, the selected plasticisers are preferably present up to 10% by weight, with respect to the total weight of the composition.

The lubricants are preferably selected from the esters and metal salts of fatty acids such as for example zinc stearate, calcium stearate, aluminium stearate and acetyl stearate. Preferably, the composition of the film of the invention comprises up to 1% by weight of lubricants, more preferably up to 0.5% by weight, with respect to the total weight of the composition. Examples of nucleating agents include the sodium salt of saccharine, calcium silicate, sodium benzoate, calcium titanate, boron nitride, isotactic polypropylene, or low molecular weight PLA. These additives are preferably added in quantities up to 10% by weight and more preferably up to 5% by weight, with respect to the total weight of the composition.

Pigments may also be added if necessary, for example titanium dioxide, clays, copper phthalocyanine, silicates, iron oxides and hydroxides, carbon black and magnesium oxide. Among the vinyl polymers, those preferred are polyethylene, polypropylene, their copolymers, polyvinyl alcohol, polyvinyl acetate, polyethyl vinyl acetate and polyethylene vinyl alcohol, polystyrene, chlorinated vinyl polymers, polyacrylates.

As far as the polyamides which may be present in a composition of the film of the invention are concerned, these are preferably selected from the group consisting of 6 and 6,6 polyamides, 9 and 9,9 polyamides, 10 and 10,10 polyamides, 11 and 11,11 polyamides, 12 and 12,12 polyamides and combinations thereof of the 6/9, 6/10, 6/11, 6/12 type, their mixtures and both random and block copolymers.

Preferably, the polycarbonates are selected from the group consisting of polyalkylene carbonates, more preferably polyethylene carbonates, polypropylene carbonates, polybutylene carbonates, their mixtures and both random and block copolymers.

Among the polyethers, those preferred are those selected from the group consisting of polyethylene glycols, polypropylene glycols, polybutylene glycols, their copolymers and their mixtures having molecular weights from 70000 to 500000.

As far as the diacid diol polyesters different from the aliphatic polyesters (i) and the aliphatic-aromatic polyester (ii) are concerned, these preferably comprise:
  a) a dicarboxylic component comprising with respect to the total dicarboxylic component:
    a1) 20-100% by moles of units deriving from at least one aromatic dicarboxylic acid,
    a2) 0-80% by moles of units deriving from at least one saturated aliphatic dicarboxylic acid, and
    a3) 0-5% by moles of units deriving from at least one unsaturated aliphatic dicarboxylic acid; and
  b) a diol component comprising with respect to the total diol component:
    b1) 95-100% by moles of units deriving from at least one saturated aliphatic diol, and
    b2) 0-5% by moles of units deriving from at least one unsaturated aliphatic diol.

Preferably, aromatic dicarboxylic acids, saturated aliphatic dicarboxylic acids, unsaturated aliphatic dicarboxylic acids, saturated aliphatic diols and unsaturated aliphatic diols for the said polyesters are selected from those described above for the aliphatic polyester (i) and the aliphatic-aromatic polyester (ii) of the composition of the film of the invention. More preferably, the diacid-diol polyesters different from the aliphatic polyesters (i) and the aliphatic-aromatic polyester (ii) are selected from the group consisting of poly(ethylene terephthalate), poly(propylene terephthalate), poly(butylene terephthalate), poly(ethylene 2,5-furandicarboxylate), poly(propylene 2,5-furandicarboxylate), poly(butylene 2,5-furandicarboxylate) and block or random copolymers of the poly(alkylene 2,5-furandicarboxylate-co-alkylene terephthalate) type.

The composition of the film of the invention is extremely suitable for use in many practical applications, in particular for the manufacture of films such as blown films, including multilayer films.

The film of the invention typically has a total thickness lower than 50 μm, preferably equal to or lower than 30 μm, more preferably equal to or lower than 15 μm. The thickness of the film can be measured by any suitable techniques such as a micrometer or an electron microscope.

The film of the invention advantageously has an optimum combination of mechanical properties.

In particular, the film of the invention advantageously has values of elongation at break ($\varepsilon_b$) of at least 190%, preferably of at least 240%, measured according to ASTM D882 (23° C., 50% relative humidity). The film of the invention advantageously has values of elongation at break of at most 500%, measured according to ASTM D882 (23° C., 50% relative humidity).

Also, the film of the invention advantageously has values of elastic modulus (E) of at most 1000 MPa, preferably of at most 850 MPa, measured according to ASTM D882 (23° C., 50% relative humidity). The film of the invention advantageously has values of elastic modulus (E) of at least 400 MPa, measured according to ASTM D882 (23° C., 50% relative humidity).

Further, the film of the invention advantageously has values of energy at break ($En_b$) of at least 3300 kJ/m$^2$, preferably of at least 4500 kJ/m$^2$, measured according to ASTM D882 (23° C., 50% relative humidity) on a film having a thickness of 20 μm. The film of the invention advantageously has values of energy at break ($En_b$) of at most 8000 kJ/m$^2$, measured according to ASTM D882 (23° C., 50% relative humidity) on a film having a thickness of 20 μm.

The film of the invention may advantageously be prepared by cast extrusion processes of the composition as defined above.

Films comprising the composition of the invention find application in the construction of mulch films thanks to their high degree of disintegration at low temperatures, accompanied by strong mechanical properties, being therefore capable of effectively performing their action of protecting the ground, for example impeding the growth of weeds and reducing water consumption, without the need to be removed after use.

Preferably, disintegration of the films comprising the composition of the invention takes place in the ground, typically at temperatures of 28° C.±2, and the degree of disintegration will be determined visibly through periodical observations. Preferably, films comprising the composition of the invention will no longer be visible after 120 days, preferably after 112 days, more preferably after 90 days' disintegration.

The film of the invention also finds application in the agrotextile sector.

The composition of the invention further finds application for the manufacture of other types of articles such as fibres, non-woven fabrics, sheets, moulded, thermoformed, blown, and expanded articles and laminated articles, including using the extrusion coating technique.

The present invention also relates to articles comprising the film of the invention.

Examples of products comprising the composition of the invention are:

films, both mono and bi-oriented films, and multilayer films with other polymer materials;

films for use in the agricultural sector such as mulch films;

fabrics for use in the agricultural sector such as agrotextile membranes;

stretchable film, including cling film for foodstuffs, for baling in agriculture and for wrapping wastes;

bags and liners for organic collection, such as the collection of food waste and grass cuttings;

thermoformed food packaging, both monolayer and multilayer, such as for example containers for milk, yogurt, meat, beverages, etc.;

coatings obtained using the extrusion coating technique;

multilayer laminates with layers of cardboard, plastics, aluminium, metallised films;

containers in general for fruit and vegetables;

composites with gelatinised starch, destructured and/or complexed starch, natural starch, flours, other fillers of natural, plant or inorganic origin as filler;

fibres, microfibers, composite fibres with a core comprising rigid polymers such as PLA, PET, PTT etc., and an outer skin of the composition according to the invention, deblens composite fibres, fibres having diverse cross-sections, from round to multilobate, flock fibres, woven and non-woven or spun bonded or thermobonded fabrics for the sanitary, hygiene, agricultural and clothing sectors.

The invention will now be illustrated with some embodiments which are intended to be purely by way of example without limiting the scope of protection of this patent application.

EXAMPLES

Component i i-1=Poly(1,4-butylene succinate) ("PBS") prepared according to the following method: 17150 g of succinic acid, 14000 g of 1,4-butanediol, 26.75 g of glycerine and 2.0 g of an 80% by weight ethanolic solution of diisopropyl triethanolamine titanate (Tyzor TE containing 8.2% by weight of Titanium) were added in a diol/dicarboxylic acid molar ratio (MGR) of 1.07 to a steel reactor having a geometrical capacity of 60 litres fitted with a mechanical stirring system, an inlet for nitrogen, a distillation column, a knock-down system for high boiling distillates and a connection to a high vacuum system. The temperature of the mass was gradually raised up to 230° C. over 120 minutes. When 95% of the theoretical water had been distilled off, 21.25 g of tetra n-butyl titanate (corresponding to 119 ppm of metal with respect to the quantity of poly-1,4-butylene succinate theoretically obtainable if all the succinic acid fed to the reactor is converted) were added. The temperature of the reactor was then raised to 235-240° C. and the pressure was gradually reduced to reach a value of less than 2 mbar over a period of 60 minutes. The reaction was allowed to proceed for the time necessary to obtain the poly(1,4-butylene succinate) with a MFR of approximately 7 g/10 minutes, measured at 190° C. and 2.16 kg. The material was then discharged into a water bath in the form of a string and granulated.

i-2=Poly(1,4-butylene succinate-co-1,4-butylene azelate) ("PBSAz") prepared according to the following method: 14830 g of succinic acid, 2625 g of azelaic acid, 13450 g of 1,4-butan diol, 25.7 g of glycerine and 2.0 g of an 80% by weight ethanolic solution of diisopropyl triethanolamine titanate (Tyzor TE containing 8.2% by weight of Titanium) were added in a diol/dicarboxylic acid molar ratio (MGR) of 1.07 to a steel reactor having a geometrical capacity of 60 litres fitted with a mechanical stirring system, an inlet for nitrogen, a distillation column a knock-down system for high boiling point distillates and a connection to a high vacuum system. The temperature of the mass was gradually raised to 230° C. over a period of 120 minutes. When 95% of the theoretical water had been distilled off, 21.25 g of tetra n-butyl titanate (corresponding to 119 ppm of metal with respect to the quantity of poly(1,4-butylene succinate-co-1,4-butylene azelate) which could theoretically be obtained by converting all the succinic acid and the azelaic acid fed to the reactor) were added. The temperature of the reactor was then raised to 235-240° C. and the pressure was reduced gradually so as to reach a value of less than 2 mbar over a period of 60 minutes. The reaction was allowed to proceed for the time necessary to obtain a poly(1,4-butylene succinate-co-1,4-butylene azelate) with a MFR of approximately 7 g/10 minutes, measured at 190° C. and 2.16 kg. The material was then discharged into a water bath in the form of a string and granulated.

Component ii ii-1=Poly(1,4-butylene adipate-co-1,4-butylene terephthalate) ("PBAT") prepared according to the following method: 7453 g of terephthalic acid, 7388 g of adipic acid, 12033 g of 1,4-butanediol, 4.4 g of glycerine and 3.4 g of a 80% by weight ethanolic solution of diisopropyl triethanolamine titanate (Tyzor TE containing 8.2% by weight of Titanium) were added in a diol/dicarboxylic acid molar ratio (MGR) of 1.40 to a steel reactor having a geometrical capacity of 60 litres fitted with a mechanical stirring system, an inlet for nitrogen, a distillation column, a knock-down system for high boiling point distillates and a connection to a high vacuum system. The temperature of the mass was gradually raised to 230° C. over a period of 120 minutes. When 95% of the theoretical water had been distilled off, 17.0 g of tetra n-butyl titanate (corresponding to 119 ppm of metal with respect to the quantity of poly(1,4-butylene adipate-co-1,4-butylene terephthalate) which could theoretically be obtained by converting all the adipic acid and the terephthalic acid fed to the reactor) were added. The temperature of the reactor was then raised to 235-240° C. and the pressure was reduced gradually to reach a value of less than 2 mbar over a period of 60 minutes. The reaction was allowed to proceed for the time necessary to obtain a poly (1,4-butylene adipate-co-1,4-butylene terephthalate) with a MFR of approximately 6 g/10 minutes, measured at 190° C. and 2.16 kg. The material was then discharged into a water bath in the form of a string and granulated.

ii-2=Poly(1,4-butylene adipate-co-1,4-butylene azelate-co-1,4-butylene terephthalate) ("PBATAz") prepared according to the following method: 7335 g of terephthalic acid, 6185 g of adipic acid, 1406 g of azelaic acid, 11848 g of 1,4-butanediol, 4.4 g of glycerine and 3.4 g of a 80% by weight ethanolic solution of diisopropyl triethanolamine titanate (Tyzor TE containing 8.2% by weight of Titanium) were added in a diol/dicarboxylic acid molar ratio (MGR) of 1.40 to a steel reactor having a geometrical capacity of 60 litres, fitted with a mechanical stirring system, an inlet for nitrogen, a distillation column, a knock-down system for high boiling point distillates and a connection to a high vacuum system. The temperature of the mass was gradually raised to 230° C. over a period of 120 minutes. When 95% of the theoretical water had been distilled off, 17.0 g of tetra n-butyl titanate (corresponding to 119 ppm of metal with respect to the quantity of poly(1,4-butylene adipate-co-1,4-butylene azelate-co-1,4-butyelene terephthalate) which could theoretically be obtained by converting all the adipic acid, the azelaic acid and the terephthalic acid fed to the reactor) were added. The temperature of the reactor was then raised to 235-240° C. and the pressure was reduced gradually to reach a value of less than 2 mbar over a period of 60 minutes. The reaction was allowed to proceed for the time necessary to obtain a poly (1,4-butylene adipate-co-1,4-butylene azelate-co-1,4-butylene terephthalate) with a MFR of approximately 6 g/10 minutes, measured at 190° C. and 2.16 kg. The material was then discharged into a water bath in the form of a string and granulated.

Component iii iii=Polylactic acid ("PLA") Ingeo 4043D, MFR 3.5/10 min (190° C., 2.16 kg).

Component iv iv=Masterbatch comprising 10% by weight of Joncryl ADR368CS (styrene-gycidylether-methylmethacrylate copolymer) and 90% by weight of component iii.

The compositions shown in Table 1 were fed to a APC 2030 co-rotating twin screw extruder (L/D=40; diameter 30 mm) operating under the following conditions:

rpm: 170,
throughput: 10 kg/h,
temperature profile: 30-90-140-150-200×9-160×3° C.,
open degassing.

The compositions so obtained were fed to a Ghioldi model bubble film-forming machine having a 40 mm diameter screw and L/D 30, operating at 64 rpm with a 120-150-170×2 temperature profile with a throughput of 26 kg/h. Film forming was carried out with a blowing ratio of 3 and a stretch ratio of 14× to obtain a film having a thickness of 20 μm.

The mechanical properties of films having a thickness of 20 μm comprising the composition of the invention were determined by measuring the film tensile strength according to ASTM D882 (23° C., 50% relative humidity (RH)-Vo 50 mm/min).

The values of impact strength energy [J] of films having a thickness of 20 μm comprising the composition of the invention were determined by measuring resistance of the films to impact-puncture penetration according to ASMT D3420-08a (Procedure A, 23° C., 50% RH, capacity of the pendulum: 2 J). The impact strength index [mJ/(g/m²)] of the films has been calculated by dividing the values of impact strength energy [J] by the values of grammage [g/m²] of said films (see Table 2) according to the following equation:

$$\text{Impact Strength Index} \left[\frac{mJ}{\frac{g}{m^2}}\right] = \frac{\text{Impact Strength Energy [J]}}{\text{Grammage} \left[\frac{g}{m^2}\right]} \times 1000$$

The level of disintegration in the soil of films comprising the composition of the invention was determined by inserting film samples of dimensions 5×5 cm in slide holders. The slide holders were inserted into the soil: in particular, a first layer of soil of approximately 4 cm was placed in the reactor (a plastics box of 20×30×10 cm, with a lid), the slide holders were then placed on the first layer of soil and covered with a second layer of approximately 2 cm. The slide holders were periodically observed and photographed to check their level of disintegration. The tests were carried out at a temperature of 28° C.±2.

TABLE 1

| | Compositions | | | | | |
|---|---|---|---|---|---|---|
| | Components [% by weight] | | | | | |
| Examples | i-1 PBS | i-2 PBSAz | ii-1 PBAT | ii-2 PBATAz | iii PLA | iv Masterbatch |
| Example 1 | 66.5 | — | 19 | — | 13 | 1.5 |
| Example 2 | — | 66.5 | 19 | — | 13 | 1.5 |
| Example 3 | 66.5 | — | — | 19 | 13 | 1.5 |
| Comparative Example 1 | 85.5 | — | — | — | 13 | 1.5 |
| Comparative Example 2 | — | — | 85.5 | — | 13 | 1.5 |

TABLE 2

| | Characterisation of the films | | | | | | |
|---|---|---|---|---|---|---|---|
| | Film Tensile Strength | | | | | Impact Strength (IS) (ASTM D3420-08a) | |
| | (ASTM D882) | | | | | IS | IS Energy |
| Examples | $\sigma_b$ [MPa] | $\varepsilon_b$ [%] | E [MPa] | $En_b$ [kJ/m²] | Grammage [g/m²] | Energy [J] | Index [mJ/(g/m²)] |
| Example 1 | 47 | 321 | 460 | 5765 | 28.1 | 0.25 | 9 |
| Example 2 | 46 | 460 | 480 | 7584 | 25.4 | 1.17 | 46 |
| Example 3 | 49 | 247 | 496 | 4811 | 27.5 | 0.39 | 14 |
| Comparative Example 1 | 48 | 287 | 679 | 5560 | 27.1 | 0.01 | 0.2 |
| Comparative Example 2 | 46 | 481 | 166 | 6580 | 26.6 | 1.46 | 55 |

TABLE 3

| Disintegration of the films in soil | |
|---|---|
| Examples | Disintegration |
| Example 1 | no longer visible after 120 days |
| Example 2 | no longer visible after 90 days |
| Example 3 | no longer visible after 112 days |
| Comparative Example 1 | intact after 120 days |
| Comparative Example 2 | intact after 120 days |

As shown in Table 2, the film of the invention as notably embodied by the films comprising the composition of any of Examples 1-3 surprisingly provides for films having an optimum combination of both high impact strength values and thus high resistance to impact-puncture penetration and high mechanical properties, as compared to the films obtained from the compositions of Comparative Examples 1-2.

In addition to this, as shown in Table 3, the film of the invention as notably embodied by the films comprising the composition of any of Examples 1-3 advantageously exhibits high values of disintegration kinetics at 28° C.±2. On the other side, the films obtained from the compositions of Comparative Examples 1-2 are intact after 120 days.

The invention claimed is:

1. A film comprising a composition comprising:
    i) 55-80% by weight, with respect to the total weight of the composition, of at least one aliphatic polyester (i) comprising:
        a) a dicarboxylic component comprising with respect to the total dicarboxylic component:
            a1) 70-100% by moles of units deriving from succinic acid, and
            a2) 0-30% by moles of units deriving from at least one saturated dicarboxylic acid different from succinic acid, and
        b) a diol component comprising with respect to the total diol component:
            b1) 95-100% by moles of units deriving from 1,4-butanediol, and
            b2) 0-5% by moles of units deriving from at least one saturated aliphatic diol different from 1,4-butanediol;
    ii) 5-40% by weight, with respect to the total weight of the composition, of at least one aliphatic-aromatic polyester (ii) comprising:
        a) a dicarboxylic component comprising with respect to the total dicarboxylic component:
            a1) 30-70% by moles of units deriving from at least one aromatic dicarboxylic acid, and
            a2) 70-30% by moles of units deriving from at least one saturated aliphatic dicarboxylic acid,
        b) a diol component comprising with respect to the total diol component:
            b1) 95-100% by moles of units deriving from at least one saturated aliphatic diol, and
            b2) 0-5% by moles of units deriving from at least one unsaturated aliphatic diol; and
    iii) 1-25% by weight, with respect to the total weight of the composition, of at least one polyhydroxyalkanoate, said film having an impact strength index of at least 2 mJ/(g/m$^2$), measured according to standard ASTM D3420-08a.

2. The film according to claim 1, wherein the composition comprises:
    i) 60-80% by weight, with respect to the total weight of the composition, of at least one aliphatic polyester (i),
    ii) 5-30% by weight, with respect to the total weight of the composition, of at least one aliphatic-aromatic polyester (ii), and
    iii) 1-25% by weight, with respect to the total weight of the composition, of at least one polyhydroxyalkanoate (iii).

3. The film according to claim 1, wherein the composition comprises:
    i) 60-80% by weight, with respect to the total weight of the composition, of at least one aliphatic polyester (i),
    ii) 16-30% by weight, with respect to the total weight of the composition, of at least one aliphatic-aromatic polyester (ii), and
    iii) 1-20% by weight, with respect to the total weight of the composition, of at least one polyhydroxyalkanoate (iii).

4. The film according to claim 1, wherein the dicarboxylic component a2) of the aliphatic polyester (i) is selected from the group consisting of adipic acid, azelaic acid, sebacic acid and mixtures thereof.

5. The film according to claim 1, wherein the diol component of the aliphatic polyester (i) is 1,4-butanediol.

6. The film according to claim 1, wherein the aromatic dicarboxylic acid a1) of the aliphatic-aromatic polyester (ii) is selected from aromatic dicarboxylic acids of the type of phthalic acid and heterocyclic dicarboxylic aromatic compounds, their esters, salts and mixtures.

7. The film according to claim 1, wherein the aromatic dicarboxylic acid a1) of the aliphatic-aromatic polyester (ii) is selected from terephthalic acid and their esters and salts, 2,5-furandicarboxylic acid and their esters and salts, and mixtures thereof.

8. The film according to claim 1, wherein the aliphatic dicarboxylic acid a2) of the aliphatic-aromatic polyester (ii) is selected from the group consisting of succinic acid, adipic acid, azelaic acid, sebacic acid, brassylic acid and mixtures thereof.

9. The film according to claim 1, wherein the aliphatic dicarboxylic acid a2) of the aliphatic-aromatic polyester (ii) is selected from adipic acid and azelaic acid.

10. The film according to claim 1, wherein the polyhydroxyalkanoate (iii) is selected from the group consisting of polyesters of lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly 3-hydroxybutyrate 4-hydroxybutyrate and mixtures thereof.

11. The film according to claim 1, wherein the composition comprises 0-5% by weight, with respect to the total weight of the composition, of at least one cross-linking agent and/or chain extender comprising at least one compound having two and/or multiple functional groups including groups selected from isocyanate, peroxide, carbodiimide, isocyanurate, oxazoline, epoxide, anhydride, divinyl ether and mixtures thereof.

12. The film according to claim 11, wherein the cross-linking agent and/or chain extender comprises compounds including epoxide groups of the styrene-glycidyl ether-methylmethacrylate type.

13. The film according to claim 1, wherein the composition comprises 0-30% by weight, with respect to the total weight of the composition, of at least one filler.

14. The film according to claim 1 for manufacturing mulch films.

15. A mulch film comprising the film according to claim 1.

16. The film according to claim 2, wherein the composition comprises:
    i) 60-80% by weight, with respect to the total weight of the composition, of at least one aliphatic polyester (i),
    ii) 16-30% by weight, with respect to the total weight of the composition, of at least one aliphatic-aromatic polyester (ii), and
    iii) 1-20% by weight, with respect to the total weight of the composition, of at least one polyhydroxyalkanoate (iii).

17. The film according to claim 2, wherein the dicarboxylic component a2) of the aliphatic polyester (i) is selected from the group consisting of adipic acid, azelaic acid, sebacic acid and mixtures thereof.

18. The film according to claim 3, wherein the dicarboxylic component a2) of the aliphatic polyester (i) is selected from the group consisting of adipic acid, azelaic acid, sebacic acid and mixtures thereof.

19. The film according to claim 2, wherein the diol component of the aliphatic polyester (i) is 1,4-butanediol.

20. The film according to claim 3, wherein the diol component of the aliphatic polyester (i) is 1,4-butanediol.

* * * * *